June 14, 1932.  W. VINNICK  1,863,424

CUTTING IMPLEMENT

Filed Jan. 12, 1931

Inventor

William Vinnick,
By Edwin Guthrie,
Attorney

Patented June 14, 1932

1,863,424

UNITED STATES PATENT OFFICE

WILLIAM VINNICK, OF WHITESTONE, FLUSHING, NEW YORK

CUTTING IMPLEMENT

Application filed January 12, 1931. Serial No. 508,252.

This invention relates to cutting implements operated by hand and adapted for cutting sheet material whether of paper, paper board, fabric, leather or sheet metal, and it is not limited as to size as a whole or in part.

The invention has for its object the production of a cutting implement for varied uses having parts of special construction and arrangement whereby it is believed a particularly strong and efficient hand cutter, cheap to manufacture, very simple in its individual members and in the assembling thereof, and usable by persons without mechanical knowledge or skill in the manipulation of tools, is provided.

Figure 1:
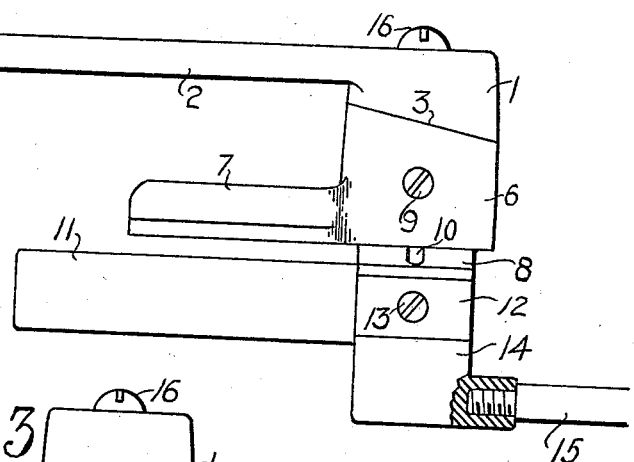
Figure 2:
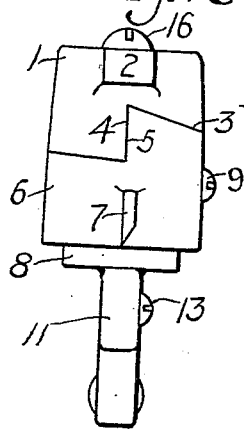
Figure 3:
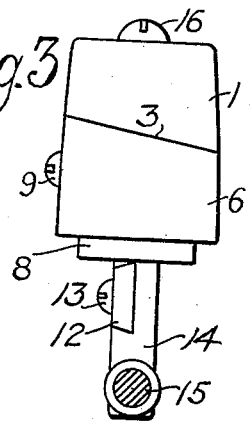
Figure 4:
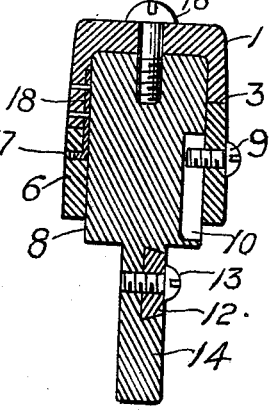
Figure 6:
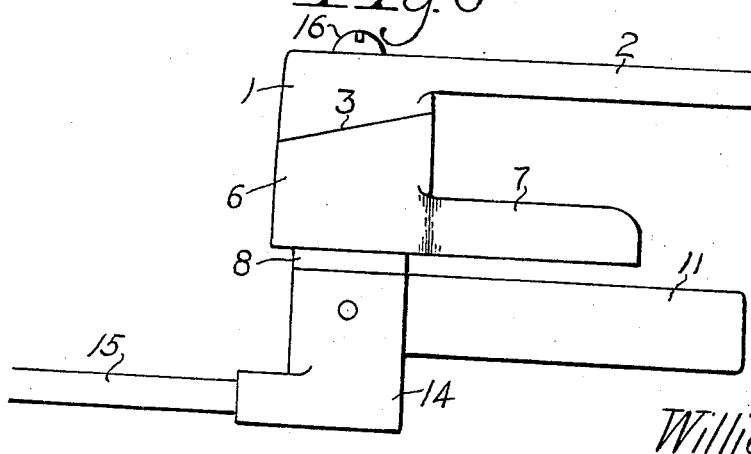
Figure 5:
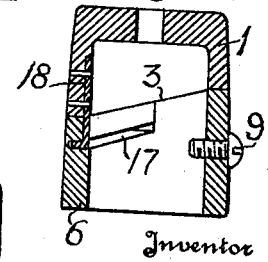

The special construction and combinations of the parts of this invention are illustrated in the accompanying drawing of which Fig. 1 represents a side view of all parts assembled. Fig. 2 is an end view from the left hand side of Fig. 1. Fig. 3 is a like end view from the right hand side of Fig. 1. Fig. 4 is a vertical cross section through the middle of Fig. 2. Fig. 5 is a like vertical section of the spiral cam members detached. Fig. 6 is a side view from the opposite side from that shown in Fig. 1.

Throughout the drawing and description the same number is used to refer to the same part.

Considering the drawing, a rotative member 1 has a handle 2 of any chosen size, length or formation, and a spiral cam lower edge 3. The lowest and highest points of the edge 3 are joined as illustrated in Fig. 2 by a vertical edge 4 that meets a like vertical edge 5 of the reciprocating member 6. The member 6 has a projecting cutting blade 7, and works up and down on a cylindrical body 8. To prevent the member 6 from turning a screw 9 is let through the wall of the member into a longitudinal groove 10 in the body 8. This construction is best set forth in Fig. 4. The body 8 has a projecting blade or cutter bar upon which the material may be placed when cut, and the bar 11 is usually formed with a dovetail end 12 let into the corresponding recess in the body 8 and held removably in place by the screw 13. The lower portion 14 of the body 8 may be provided with a handle 15, which can be removable as shown. The special shape of the handles is immaterial.

The rotative member 1 is held upon the body 8 by means of the top screw 16.

As best understood from Figs. 4 and 5 the reciprocating cam member 6 has an internal spiral groove 17, and the rotative member 1 has an internal hook 18 arranged in engagement with the groove 17.

In operation, if the handle 15 is grasped in one hand and the handle 2 suitably turned by the other hand, the cutting blade 7 is moved down upon the blade or bar 11 to cut any material upon the bar. The width and length of the bar may be changed to suit special work. As the reciprocating member 6 and blade 7 are forced down, the end of the internal hook 18 follows groove 17. But when the handle 2 is turned back into its first position as shown in Figs. 2 and 6, the hook lifts the member 6 into its highest position shown in those figures.

Having now described this invention, I claim:—

1. A cutting implement having a cylindrical body, a member revoluble upon the body and having means for holding it against lengthwise movement on the body, said member having a spiral cam edge and a projecting handle, a second member having a movement lengthwise on the body and means for holding said member against rotation, said second member having a spiral cam edge adapted to co-act with the corresponding edge of said first member, said second member having a projecting cutting blade, said body having a projecting blade arranged below the said blade of the second member and a handle projecting in a direction different from the projection of the said blade on the second member.

2. In an implement of the character described, a rotatory member and a reciprocating member, said members having co-acting spiral cam edges, one of said members having an internal spiral groove extending for a part of the distance around the inside of said member, and the other member having a hook internally attached to the member and in engagement with the said groove for moving the reciprocating member.

In testimony whereof I affix my signature.

WILLIAM VINNICK.